United States Patent [19]

Jessee

[11] Patent Number: 5,138,544
[45] Date of Patent: Aug. 11, 1992

[54] HARMONICALLY MODIFIED TWELVE-POLE INVERTER

[75] Inventor: Ralph D. Jessee, Lima, Ohio

[73] Assignee: Westinghouse Electric Corp., Pittsburgh, Pa.

[21] Appl. No.: 679,417

[22] Filed: Apr. 2, 1991

[51] Int. Cl.[5] .................................................. H02M 7/44
[52] U.S. Cl. .......................................... 363/43; 363/98; 363/132
[58] Field of Search .................... 363/40, 43, 98, 132

[56] References Cited

U.S. PATENT DOCUMENTS

| | | |
|---|---|---|
| 3,324,374 | 6/1967 | Corey . |
| 3,477,010 | 11/1969 | VeNard . |
| 3,638,094 | 1/1972 | VeNard . |
| 3,979,662 | 9/1976 | Klein . |
| 4,204,264 | 5/1980 | Lipman . |
| 4,225,914 | 9/1980 | Hirata . |
| 4,554,501 | 11/1985 | Baker . |
| 4,851,723 | 7/1989 | Barnhardt . |
| 4,870,557 | 9/1989 | Stacey . |
| 4,961,129 | 10/1990 | Shekhawat . |
| 4,977,492 | 12/1990 | Kirchberg, Jr. et al. . |

OTHER PUBLICATIONS

Sales Brochure: "Bendix VSCF Technology–Allied Signal Technology", (Bendix Electric Power Division), Circa 1989, 15 pages, especially p. 6, 7 relating to Operation of a Typical Bendix "DC-Link" AC to AC Converter described with respect to FIGS. 3-6.

Primary Examiner—Steven L. Stephan
Assistant Examiner—Adolf Berhane
Attorney, Agent, or Firm—J. K. Williamson

[57] ABSTRACT

Apparatus and method for a twelve-pole inverter for eliminating all of the relevant low-order harmonic component frequencies, except the fundamental for an AC output from a source of DC input voltage. The inverter circuit provides four separate three-phase sets of constantly phase displaced pole voltages from controlled six-pulse bridge inverter circuits. Additional phase displacements for straddled paired-sets of the pole voltages are introduced with a first and second predetermined phase displacement proportion of 2:1 or 15 degrees. One paired-set of pole voltages is input to a transformer configuration of a wye with a delta, and the other paired-set of pole voltages is input to a neutralizing transformer with a truncated delta paired configuration for low-order cancellation of harmonics. A phase separated composite output circuit connects series aiding and series opposing secondary winding components coupled from the two sets of paired transformer windings to provide coupled fundametal voltages with low-order odd harmonic components eliminated below twenty-three times the fundamental frequency.

12 Claims, 5 Drawing Sheets

K=.366

K = .366
ROTATION = ABC

HARMONICALLY MODIFIED TWELVE-POLE INVERTER

CROSS REFERENCE TO RELATED APPLICATIONS

The present application is related to the following concurrently filed U.S. patent application Ser. No. 07/679,484 filed Apr. 2, 1991, by Ralph D. Jessee, entitled "Voltage and Harmonic Control of a Multi-Pole Inverter."

BACKGROUND OF THE INVENTION

This invention relates in general to multiphase inverter systems for AC generators which incorporate static electrical power conversion elements and, more particularly, to a three-phase inverter with a composite output transformer which provides an AC output voltage which is regulated and independent of a DC input voltage, over a predetermined range.

The invention is particularly applicable to aviation electrical power generation requirements which rely on state of the art electronic features, such as variable speed constant frequency (VSCF) electrical power generators with DC-link control, which are needed aboard present and future military aircraft and for multi-engine commercial aircraft as well. It will be appreciated that the invention has broader applications such as wherever it is needed to provide output power voltage regulation from a static inverter without mandating the controlling of the DC input voltage to the inverter.

Each VSCF generator unit aboard an aircraft includes a three-phase power inverter paired with a propulsion engine in order that each engine can be used to help fulfill the requirement of system redundancy to enhance operational safety. This ensures that the entire electrical power output needs for the aircraft will be met in order to keep the aircraft operational. The VSCF system according to U.S. Pat. No. 4,554,501, entitled "Variable Speed Constant Frequency Power System With Auxiliary DC Output," is assigned to the same assignee as the present invention, and it is hereby incorporated by reference into the present application. Another variable speed generator is of the type described in U.S. Pat. No. 4,851,723 entitled "Coolant Pump System for Variable Speed Generators" which also is assigned to the present assignee, and it also provides a proper environment for the presently intended multiphase inverter system.

The three-phase inverters that are used with DC-link frequency conversion for aircraft power generation systems, operating at 400 Hertz and 20 to 50 Kilovolt-amps (KVA), are a subset of static inverters employing semiconductor switching devices which are used for many other applications. These include industrial drive, power conditioning, and the generation of controllable leading or lagging reactive current. In each of these applications, there is a common problem which is difficult to solve. It is the elimination and/or reduction to filterable minimum values of troublesome AC harmonic frequencies which are whole number multiples of the fundamental frequency in Hertz. One approach to solving the problem of harmonic neutralization is according to U.S. Pat. No. 4,870,557, entitled "Simplified Quasi-Harmonic Neutralized High Power Inverters," which has been assigned to the same assignee as the present invention. The above assigned patent is hereby incorporated by reference into the present application and will be hereinafter referenced as the first incorporated U.S. patent. This first incorporated U.S. patent takes advantage of the double fed twenty-four pulse inverter comprised of a standard group of four six-pulse inverters connected to reduce the complexity of and to half the number of normally required phase shifting transformers with open primary winding neutrals. Furthermore, the secondary winding of at least one of the phase shifting transformers is a delta or a wye winding connected to a neutral line in order to simplify the quasi-harmonic neutralization of the output.

Another timely approach directed toward solving the problem of harmonic neutralization is with the implementation of twelve-pulse and twenty-four pulse inverters assembled from pairs of six-pulse inverters with strategic placement of time-paired notching sets for the reversal of the pole voltage. This approach places each notch with a timing duration within a limited band near to the leading and trailing portions of a half-wave periodicity, and it significantly decreases the original phase displacement of the pole voltages, while offering the simplicity of a single output coupling transformer. This is the subject of pending U.S. No. 07/612,647, filed Nov. 13, 1991 entitled "Static Inverter" assigned to the same assignee as the present invention, and it is hereby incorporated by reference into the present application and will be hereinafter referenced as the first incorporated U.S. application. The clear benefit to be derived in notching the switching output of the inverters, within this leading and trailing portion timing range, is the affect it has on some of the most significant harmonics. This viewpoint is for some of the practical applications of the quasi-harmonic neutralized output voltage waveform in which some harmonics are reduced and/or eliminated; i.e., the fifth and seventh harmonics are eliminated and the eleventh and thirteenth are significantly reduced.

Another timely approach directed toward solving the problem of harmonic neutralization is with the implementation of a six-pole inverter apparatus assembled from a pair of six-pulse bridge inverter circuits which provide three-phase pole output voltages which are switched or notched in an optimized variable placement with respect to preselected phase positions and variable pulse width or duration. This is the subject of copending U.S. patent application Ser. No. 07/679,484 entitled "Voltage and Harmonic Control of a Multi-Pole Inverter" assigned to the same assignee as the present invention, and it is hereby incorporated by reference into the present application and will be hereinafter referenced as the second incorporated U.S. application for patent.

The clear benefit to be derived from notching the switching output of the inverters of the six-pole static inverter is the reduced weight realized by the optimized configuration. This configuration incorporates a pair of neutralizing transformers connected, for example, in a wye with a delta paired configuration in order to reduce the harmonic content of the output voltage of the inverter circuit to a filterable minimum of any harmonic components remaining after cancelling all harmonics of the fundamental output voltage, except for the harmonic voltage components with a frequency immediately next adjacent to a whole number multiple of twelve times the fundamental frequency.

One of the principal practical considerations in the above realization of six-pole static inverter harmonic neutralization of the type described, is in contrast that a twelve-pole static inverter provides further flexibility and a broader zone of control for the AC output voltage. Albeit, there is an inherent weight penalty for harmonically neutralizing components over a predetermined range of voltage control of the fundamental frequency component independent of the DC source voltage. It is anticipated from the invention that a twelve-pole static inverter of a presently known design can be modified to improve harmonic reduction of low-order harmonic components that are troublesome; by way of retrofitting with the present invention, an improved weight reduction is achieved with the need for electrical filtering components of only reduced size and functional limit requirements.

Another problem related to the above concerns is that the low-order harmonic component neutralization with the twelve-pole inverter circuit should eliminate all of the harmonic components below twenty-three times the fundamental frequency.

The solution should further concern the provision that all odd-harmonic components immediately next adjacent to whole number multiples of twenty-four times the fundamental frequency are rendered inconsequential and thereby reduce filtering requirements, over the entire range of control.

SUMMARY OF THE INVENTION

In accordance with the present invention, there is provided a new and improved twelve-pole inverter apparatus and method used for producing a harmonically neutralized AC output, voltage-regulated at a constant frequency.

In accordance with another aspect of the invention the twelve-pole inverter is in a three-phase inverter system which is adapted to provide reduced harmonic content of the inverter circuit and to eliminate all of the odd number harmonic components of less than twenty-three times the fundamental frequency. All of the other output voltage harmonic components are cancelled except those occurring at an odd number harmonic frequency immediately next adjacent to whole number multiples of twenty-four times the fundamental frequency.

In accordance with the invention, an inverter circuit apparatus of the general type described is provided wherein two pairs of six-pulse bridge inverter circuits are used to provide four separate sets of nominally or 120 degrees phase displaced pole voltages in two set-pairs of three-phase pole voltages. Each of the three pole voltages of each half of a set-pair is relatively phase displaced a first predetermined amount such as 30 degrees with respect to the other half of each set-pair of pole voltages for the individual phases of respective circuits from the bridge inverter. Each phase pole voltage of the second set-pair is phase displaced one-half the first predetermined amount or 15 degrees in a straddled phase relationship with the respective phase pole voltages of the individual first and second halves of the first set-pair of pole voltages. A first pair of neutralizing transformers includes a wye with a delta paired configuration which are respectively connected to receive the pole voltages from the first set-pair, and another pair of neutralizing transformers are connected in a delta with another delta paired configuration of truncated form to receive the pole voltages from the second set-pair of bridge inverters to thereby reduce and eliminate the low-order harmonic component content while preserving the fundamental component output voltage waveform.

Further in accordance with the invention an output circuit, with terminals at which the harmonically neutralized fundamental output voltages are measured, is formed from a composite transformer circuit which combines series aiding and series opposing transformer windings from the neutralizing transformers. The additive component windings are serially connected per phase in a transformer coupled closed-wye secondary composite circuit which includes four secondary windings per phase, counting three dissimilar turns ratios, which are coupled to similarly sensed respective phase primary main windings of the associated neutralizing transformers. A respective interphase winding for each phase of the truncated delta neutralizing transformers is serially connected in a series opposing triad and each of the connected interphase windings forms a dissimilar phase-core pair connected inbetween two of primary main transformer windings.

Also in accordance with the invention, the six-pulse circuits are adapted to be switchably controlled by strategically notching or reducing the pole voltage therefrom within the range of a strategically zoned or positioned half-wave pair of controlled time interval notches.

BRIEF DESCRIPTION OF THE DRAWINGS

The invention may be better understood, and further advantages and uses thereof more readily apparent, when considered in view of the following detailed description of exemplary embodiments taken with the accompanying drawings in which.

DETAILED DESCRIPTION OF THE PREFERRED EMBODIMENTS

This invention is a new and improved twelve-pole inverter apparatus and a method of operating a three-phase inverter for producing a harmonically neutralized AC output voltage regulated at a relatively constant frequency. An aircraft generator of the variable speed constant frequency (VSCF) type is preferred over constant speed drive generators (CSD) for generating AC power for multi-or three-phase power with a frequency of 400 Hz because of improved power to weight ratios and greater reliability. This enhancement is similarly applicable to requirements for both military and commercial operations which require the provision of AC output voltage that is regulated at a constant frequency.

The new and improved inverter system and method are described by illustrating only those parts of the inverter system pertinent to the understanding of the invention, and the supplemental portions of a generator system have been incorporated by reference to issued U.S. patents as assigned to the same assignee as the present application. The principal requirements for an inverter of the type useful with VSCF airborne power generation systems are established in order to achieve a constant output voltage by varying the DC link voltage, as needed, and a least weight configuration minimizing the number of parts is required. Another requirement which is fulfilled with this control is the constant output/link-input voltage ratio while cancelling all the low-order harmonic components below twenty-three times the fundamental frequency. All the even-harmonic components are already eliminated by the symmetry associated with the rectangular pole voltage waveforms because of related symmetry. The present harmonic component elimination thereby reduces the filtering requirements over the entire range of operation, while maintaining a high quality voltage waveform.

Figure 1:
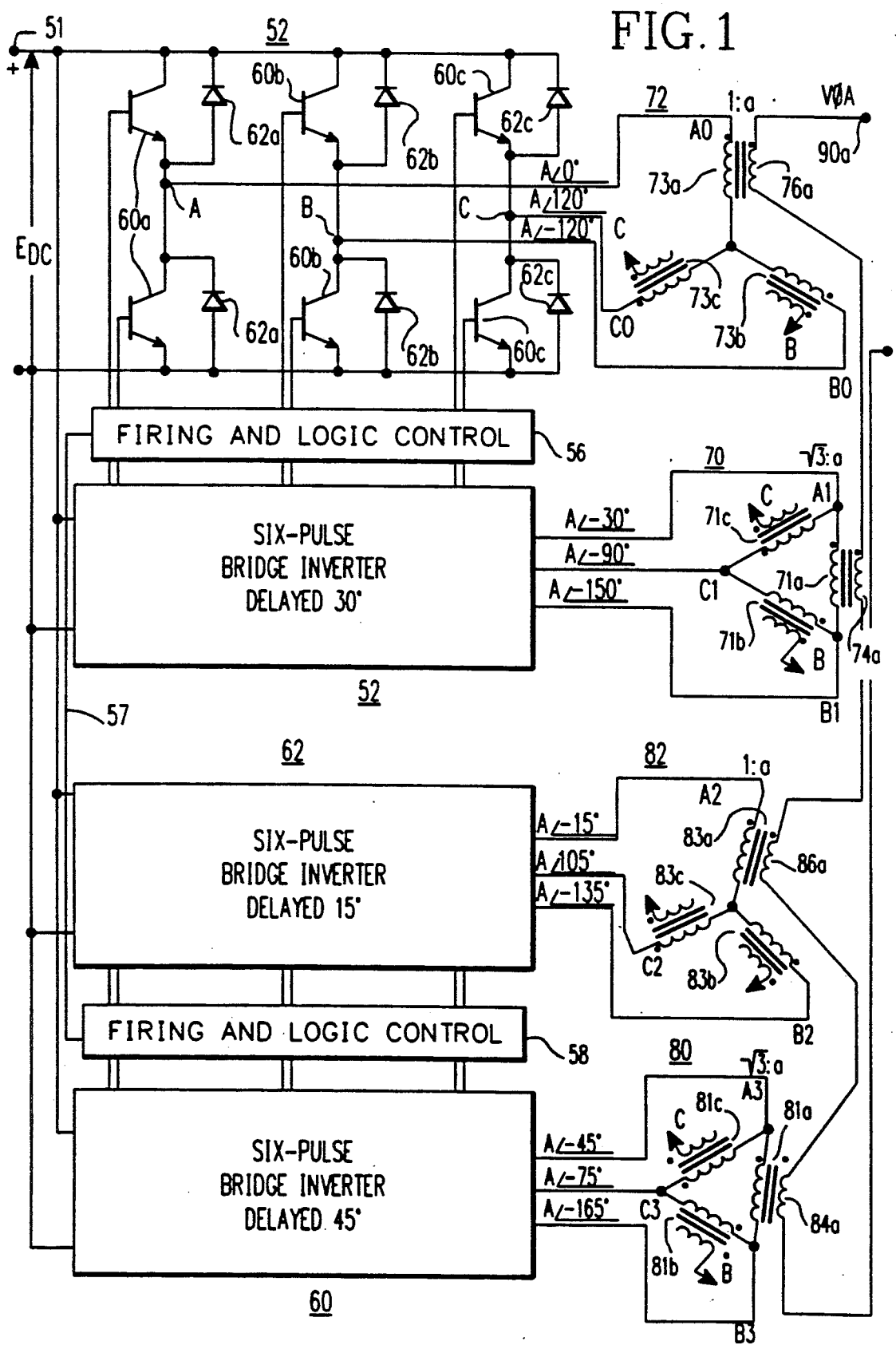
FIG. 1 is a schematic block diagram of a prior art twelve-pole, three-phase static inverter for a variable speed constant frequency ("VSCF") generator system of a DC-link type, in which the inverter has two known bridge-fed configured pairs of wye with a delta transformer circuits connected for harmonic reduction.

An example of a VSCF power system which produces a three-phase output which is maintained at a constant 400 Hz for the power usage requirements of an aircraft is shown in FIG. 1 of U.S. Pat. No. 4,851,723. This FIG. 1 is incorporated by reference, along with other descriptive matter, in the concurrently filed U.S. patent application Ser. No. 07/679,484 entitled "Voltage and Harmonic Control of a Multi-Pole Inverter" which is the reference incorporated herein as the second incorporated U.S. patent application. The second incorporated U.S. application solves the problem of harmonic neutralization by the optimization of switching with notched pole voltages in the implementation of a six-pole inverter apparatus assembled from six-pulse bridge inverter circuits which provide the three-phase pole voltages. The reduced weight realized by this optimized configuration, for example, with a pair of neutralizing transformers connected in a wye with a delta paired configuration, can be extended to the present twelve-pole static inverter, with or without notched pole voltages, in order to provide further flexibility and a broad zone of control for the AC output voltage. The introduction of two additional neutralizing transformers has a weight penalty compared to the transformer components in the six-pole inverter apparatus, but it is not considered a consequential penalty in view of the benefits derived in a modified twelve-pole configuration according to the present invention.

It is likewise intended that modification of a twelve-pole static inverter of a presently known design decouples a wye with a delta paired configuration for a redundantly occurring two-set pair of wye and delta paired transformers. The transformer connections from redundantly occurring pole-voltage sets with staggered phase displacement for the respective wye-delta paired configurations is preserved, however, as it will be described herein further, first under the representation of prior art.

Referring now to FIG. 1 which is presumed to be a schematic block diagram of a prior art twelve-pole static inverter for a variable speed constant frequency (VSCF) generator system of a DC-link type. An example of a VSCF system is found in the circuit schematic of FIG. 4 of the second incorporated U.S. application for patent, although this does not mean that in the present invention there is an indispensable requirement for any notching or switching of the rectangular pole voltage waveform of a five-pulse designation, as optimally characterized in FIG. 3 therein. The optimized notching requirement for the embodiments of FIGS. 8 and 9 were also described in the second incorporated by reference U.S. application.

There is a purpose in tying the present description closely with the second incorporated U.S. application which will serve in the interest of full cognizance and appreciation for the present invention. The starting point for same is in recognition that the present disclosure extends the generic circuit structure and function of the second incorporated application, initially with a brief re-description of a portion of FIG. 4 therein. This appears in an extended twelve-pole configuration which gains attention from the similar elements at the top of the present FIG. 1, which corresponds to the bottom portion of reference FIG. 4 therein. This is contrastingly evident from the reference numeral set which has been transferred somewhat intact for the six-pulse bridge inverter which continues to form the reference phase. Pole voltages A, B, C are separated, respectively, from each other by 120°, and this still represents generically the phase displacement for each of the pole voltages connected for the zero reference. The reference closed-wye transformer forms the starting point for the description of the first set-pair portion of the composite transformer phase output voltage V$\phi$A.

The structure of the circuit schematic in FIG. 1 takes a DC input voltage E, which is introduced at the input terminal 51, regardless of whether the source is from a battery or capacitor or a bridge rectifier output, and converts it to the phases of a three-phase output voltage A, B, C, which will be regarded as the reference phase voltages. All of these voltages are equal in magnitude and, therefore, may be represented by "A", a magnitude, for each at the respective reference phase positions of 0°, −120°, 120° which serve as the input phase terminal voltages A0, B0, C0 for the closed-wye or neutral connected transformer 72. This transformer 72, which may be composed of three single phase transformers or a three-phase transformer, constitutes one of the zero reference paired-set of neutralizing transformers along with a neutralizing transformer 70 which is connected in delta configuration to a six-pulse bridge inverter 52 with respective pole voltages for each phase. Similarly, each pole voltage terminal voltage A1, B1, C1 has an equal magnitude, A, with respect to each other and with respect to the six-pulse bridge inverter 54, but it is delayed respectively in phase by −30°, −150°, 90°. The input voltages are connected to the respective junctions A1, B1, C1, across which are connected delta leg main winding coupled pairs 71a, 71b, 71c. Phase A is shown with a secondary winding 74a being coupled to main delta winding 71a and with a composite output voltage series aiding connection to transformer 72. A similar phase coupled output winding 76a is used for main transformer winding 73a and for each of the coupled primary and secondary phase winding pairs 73a, 73b, 73c. The zero-reference neutralizing transformer 72 is in its previously mentioned closed-wye connection.

Redundancy is avoided by showing and describing only the secondary coupled output phase windings 74a, 76a, which are connected in a series circuit for one of three output phases φA, φB, φC that are each connected in a similar composite transformer output circuit. Each phase also includes another paired set of neutralizing transformers 80, 82 with coupled output secondary windings 84a, 86a. These transformers 80, 82 are shown to be formed in a similar wye with a delta paired configuration constituting the lower one-half portion of FIG. 1. The turns ratio of transformer primary to secondary coupled windings for each of the delta transformers 70, 80 is designated to be $\sqrt{3}$:a where a is a scaler quantity. The primary to secondary windings turns ratio is designated by ratio 1:a for the wye connected transformers 72, 82, which provides a compatible set of turns ratio.

A desirable effect of the composite output voltage VφA is developed by the series aiding relationship of output coupled transformer windings 74a, 76a, in the first set-pair and 84a, 86a in the second set-pair. This is realized from the phase shifting affect on the eleventh and thirteenth harmonic components so as to reduce them to about thirteen percent of their generated magnitudes or to about one percent of the fundamental component voltages but without eliminating them. The attributes of these remainder harmonic components prove to be problematical when the output voltage is required to be controlled independently of the DC source voltage which can be done by switching or notching the pole, voltages, as disclosed in the second incorporated application, but requiring only a single notch per half period if practiced with the present invention. It is desirable to completely render the 11th and 13th harmonic components ineffective or to eliminate them entirely as low-order harmonic components, free from switching or notching effects which can attach a multiplier factor of 3 or 4 to the result. This is so as to not distort the fundamental voltage components which are phase additive for each of the phase coupled transformer components. The composite phase output voltage VφA would then only include higher order harmonic components which are known to have only an inconsequential affect. If they are mainly above about twenty-four times the fundamental frequency component this avoids an increase in filtering and, furthermore, will reduce the filter size which is required.

There is a similar connection of inputs for the six-pulse bridge inverters 52, 54, with the DC voltage E connected in parallel across the positive and negative input terminals in parallel circuit configuration. This is also the DC input voltage applied in parallel circuit to the lower half of the circuit arrangement which includes six-pulse bridge inverters 60, 62, forming a second pair-set. The circuit components of each of the six-pulse bridge inverters is identical to that shown for circuit 54 which is comprised of transistor pairs 64a, 64b, 64c, which are known as Bipolar Insulated Gate Pair (BIGP) transistors or IGBT ™ which may be a Trademark of International Rectifier Corporation of El Segundo, CA. State-of-the-art devices as such are capable of running at 15,000 Hz or 15 KHz. Other switching devices such as Gate Turn-Off (GTO) thyristors or other static devices may be preferred in some other applications. Bipolar transistors can be used because switching speed is not a critical parameter, especially when notching is not used or does not impose a severe demand for higher speed operation, but is only one of the many considerations including voltage and power ratings to be met in the choice of pole switches. The BIGP transistors 64a, 64b, 64c, are shunted by free-wheeling diodes, each of which is phase designated 66a, 66b, 66c, and used for the purpose of providing a reverse shunting path around the associated transistors. This provides the rectangular waveforms A, B, C, which are of the type shown in FIG. 2A, such as REF A/$\underline{0}$°, which shows the reference pole voltage $30_{a1}$ for one periodic cycle of 360°. This corresponds to the phase input voltage A0 for the wye main winding 73a of the neutralizing transformer 72. A transposition of notation has been made from the second incorporated U.S. application in which FIG. 2 therein represented this pole voltage as $A_1$ which served as a comparable reference phase for an identically connected wye with a delta paired configuration of neutralizing transformers 70, 72.

There is duplicity which is useful from the set of phase voltage waveforms shown in FIG. 2 of the second incorporated U.S. application which eliminates the need for unduly expanding the present description. An anterior development of waveforms therein is provided for a three-phase double pair inverter output with a transformed six-step staircase output waveform 48 shown at the bottom of the FIG. 2 page, and designated as $V_{A0} + V_{ab2}$, over a full periodic cycle of 360°. All of the waveforms shown in the incorporated by reference FIG. 2 are relevant for understanding the wye with a delta pair-sets of neutralizing transformers 70 with 72, 80 with 82 of the present FIG. 1, and 70' with 72' in the present invention shown in FIG. 3. It should be noted that the subscript designations for the individual phase voltage and difference voltage elemental waveforms in FIG. 2 of the second incorporated reference application are decremented by one integer. An example of this is that the composite output of transformer windings 74a and 76a is represented by the waveform 48 which is now designated $V_{A0} + V_{ab1}$. Note that the phase delay in the present six-pulse bridge inverter 52 is $-30°$, which is identical with the phase delay of $-30°$ used in the pole voltage waveforms $40_{a2}$ with $40_{b2}$ or $A_2$, $B_2$, with their one integer higher subscripts.

The pole voltage waveform $30_{a1}$, it was said for the incorporated waveform, may take on either a high value of E volts or the other value which may be zero volts or some other values may be used for both taken with respect to an arbitrary reference. This is, for purposes of analysis, other than a neutral reference during a regular periodic cycle of 360° and alternately changing value for each respective half-period of 180°. The synchronized switching of the pairs of BIGP transistors 64a, 64b, 64c, constitutes the zero reference six-pulse bridge circuit 54. Each transistor has a control terminal connected to a firing and logic control circuit 56 as does an identical transistor circuit arrangement in the other six-pulse bridge inverter 52 of the first pair-set associated with the logic control circuit 56. This circuit structure is adapted to the task of causing the bridge inverter circuits 52, 54 to output controlled rectangular voltage waveforms so as to establish the phase angle interval control for the rectangular pole voltages, A, which are supplementally 30° phase displaced for the individual phases between sets. A similar firing and logic control circuit 58 is provided for the second pair-set of six-pulse bridge inverter circuits 60, 62. A synchronizing connection 57 is provided between the firing and logic control circuits 56, 58 in order to effect a relative firing delay of ±15° for each of the respective phase input voltages A2, B2, C2. Their respective phase displacement is −15°, −135°, 105° which supplements a 120° phase displacement with respect to each other, and there is a phase delay of −15° and −45°, respectively, with respect to the zero reference transformer 72 winding input voltage A0. This staggers or delays the respective transformer input voltages A2, B2, C2 by −15° with respect to the transformer 70 input voltages A1, B1, C1 which are delayed −30° with respect to the respective phase input voltage A0, B0, C0 of transformer 72.

Likewise, the lowermost six-pulse bridge inverter 60 has pole voltages forming input voltages A3, B3, C3 which are phase delayed −45° with respect to the zero reference. The input voltages A3, B3, C3 are phase delayed by respectively −45°, −165°, 75° and each is phase delayed 120° with respect to each other. The phase delay of −45° with respect to the zero reference phase voltage A0, B0, C0, as well as a staggered −15° phase delay with respect to the respective input voltages A2, B2, C2 which have a 15° phase advance with respect to input voltages A1, B1, C1.

The significance of this prior art arrangement of composite set-pair doubled arrangement of wye with delta configured pairs, with the set-pair inputs being phase shifted 30° from each other while straddling each other by 15°, is to reduce the eleventh and thirteenth harmonics without eliminating them from the output phase voltages VϕA. This voltage is one of the three phase output voltages which are delivered to a harmonic filter (not shown) of the type shown in FIG. 4 of the second incorporated U.S. application and comprised of an inductor 182 and a capacitor 84 in circuit or other suitable arrangement.

Each of the wye with delta paired configurations of the prior art FIG. 1 showing have a similar though phase shifted resultant output waveform before filtering compared to that shown in the bottom waveform of the second incorporated U.S. application designated 48. The results of such composite additive waveforms can now be visualized as a composite of two waveforms similar to that designated 48 and shifted so as to straddle one another with overlapping 15° phase displacements. This visualization may go beyond the need for graphic implementation because there is a deficiency in not completely eliminating the eleventh and thirteenth harmonics, and it would serve no further purpose in this analysis of prior art which falls short of having a full potential for low-order harmonic component neutralization. A basis has been established now for developing the following waveforms which are distinguishable in a supplemental way for the present invention, which completely does eliminate the eleventh and thirteenth harmonics. The mathematical and graphical phasor analysis follow thereafter in a more appropriately applicable way in order to fully demonstrate and teach the invention over the presumed prior art.

The relationships thus far described for the phase voltage waveforms introduce the symbolic reference notation which will be used throughout the specification in order to derive intermediate waveforms which combine to provide resultant and composite inverter output waveforms. Prior to filtering, this waveform is represented generically as the graphic summation of the six-step waveform $V_{A0} + V_{ab1}$ plus another derived seven-step waveform represented by the statement $(\sqrt{3})V_{2T\Delta}$ which, when combined, is representative of the composite output waveform according to the present invention. An attempt will be made to reduce the number of mathematical steps and complexity for purposes of a simple analysis. This will be more clearly appreciated with anticipation that the composite transformer output waveform VϕA is represented by the lowermost waveform designated 114 in FIG. 2B showing one cyclic period of 360°. An interphase winding to main input winding factor of K = 0.366, finds utility when the invention is implemented with a truncated delta transformer set-pair neutralizing transformer configuration 116, 118 as shown in FIG. 3, and it is also described subsequently with respect to phasor voltage diagrams of FIGS. 4A, 4B.

Figure 2A:
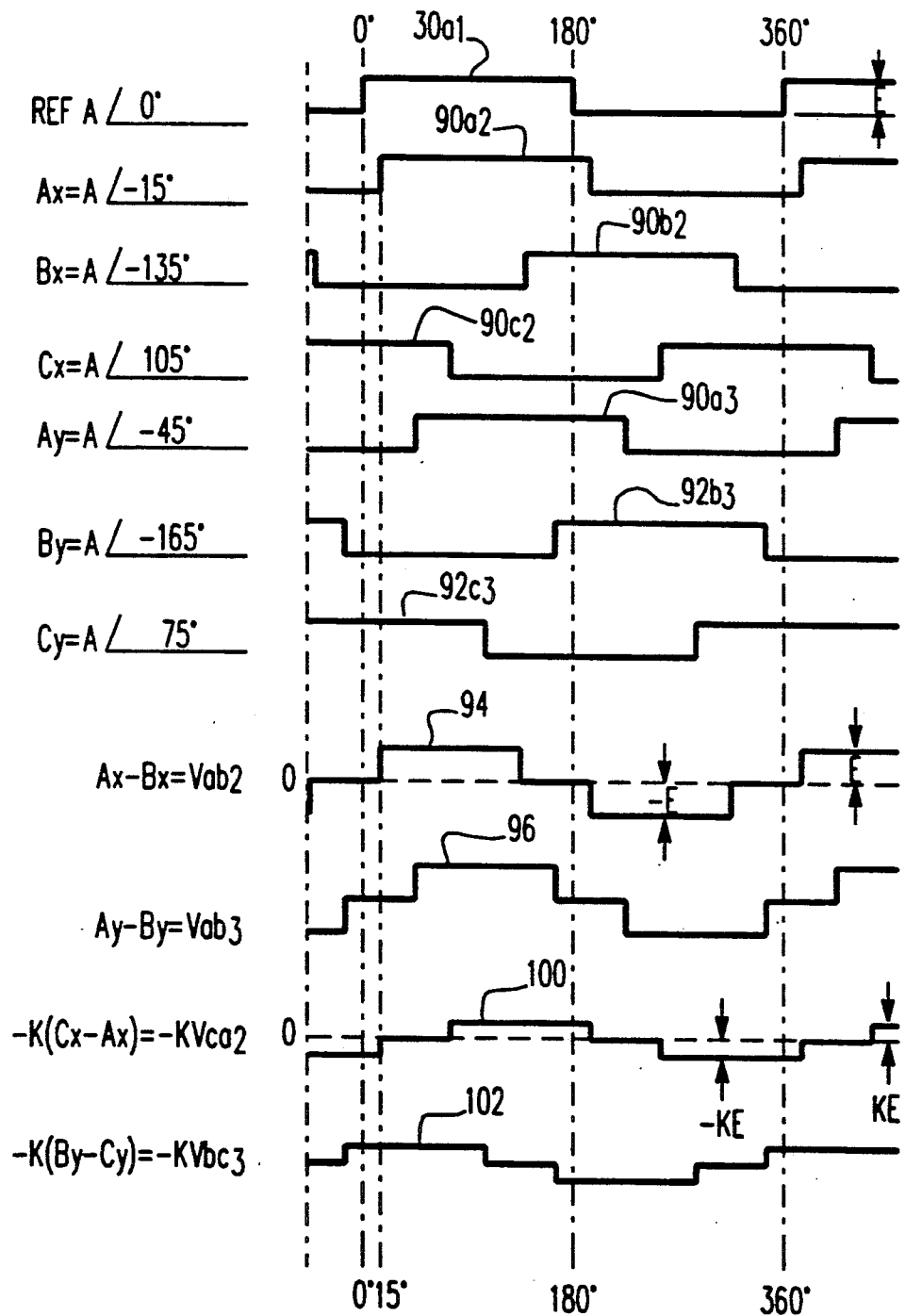
FIGS. 2A and 2B are a progressively combined set of phase voltage waveforms shown for a three-phase inverter output transformed into a twelve-step staircase sinusoidal-type waveform produced at the phase outputs of the composite transformer circuit pair configurations in FIG. 3, according to the invention.
Figure 2B:
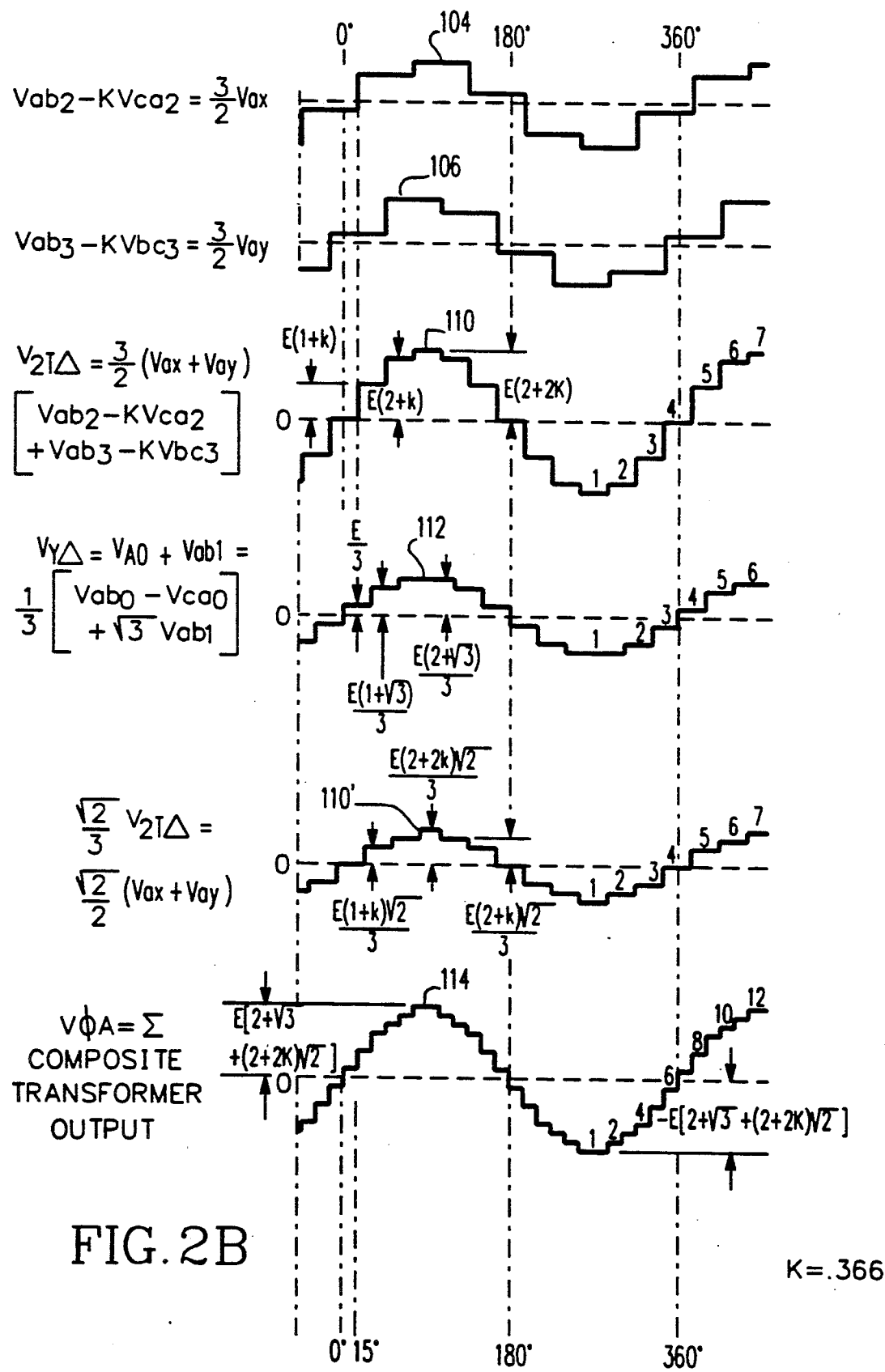
Figure 3:
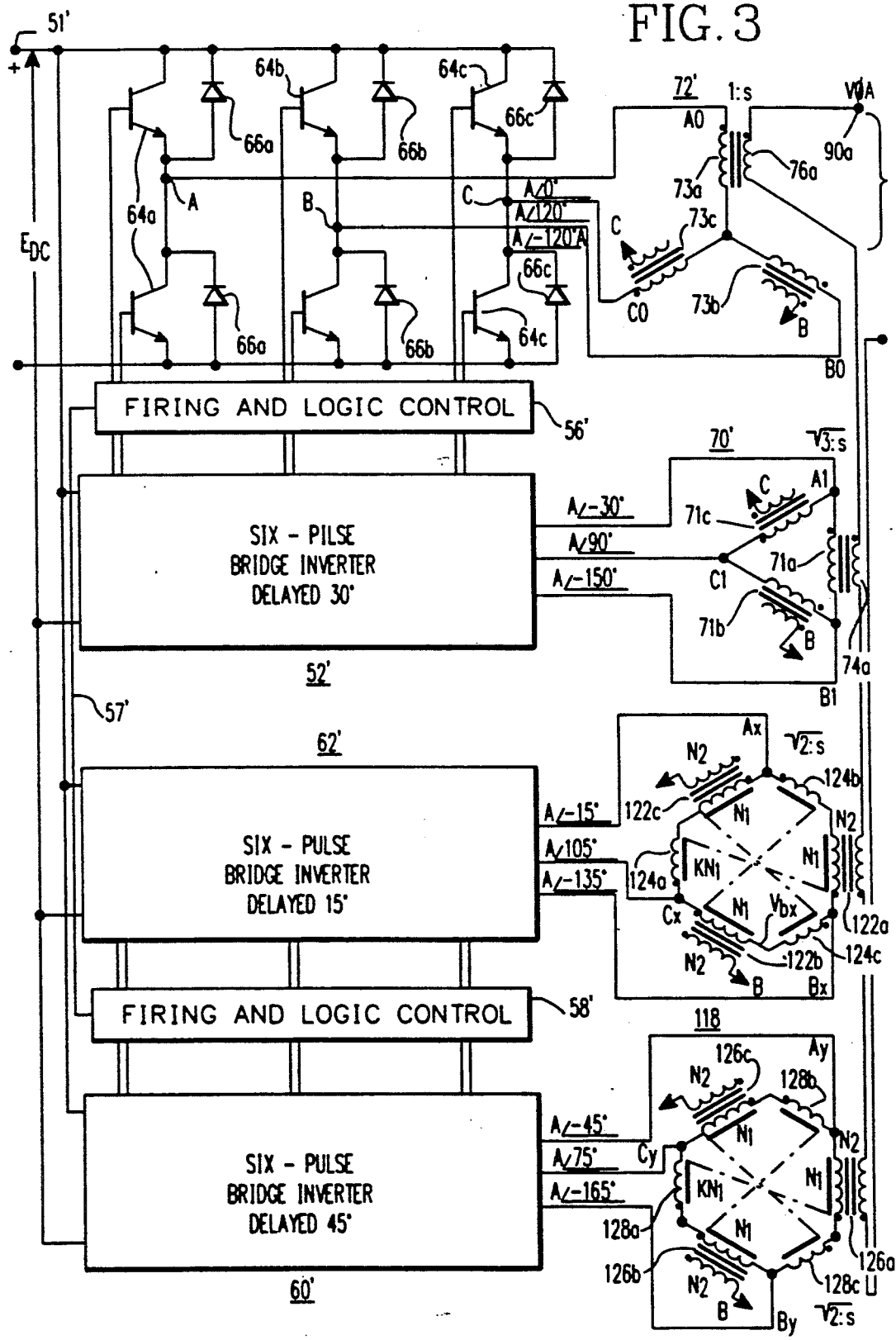
FIG. 3 shows a circuit schematic of a twelve-pole, three-phase static inverter for a VSCF generator system in which the inverter has a wye with a delta transformer circuit pair as in FIG. 1 and a delta with another delta circuit configured pair with truncated delta transformer windings connected for harmonic reduction, according to the invention; and, FIGS. 4A and 4B show a graphic phasor summation of the main winding resultant output voltages represented by a balanced set of delta winding voltage phasors shown in relative magnitude and phase, vectorially supplemented by interphase winding component voltage phasors for the truncated delta transformers of FIG. 3.

Since having referred to the waveforms of FIG. 2, in the second incorporated U.S. application, it is helpful to reexpress the output voltage $V_{A0}$ for the present zero reference neutralizing transformer 72′ of FIG. 3 in terms of the present symbolic reference notation. The incorporated reference equation (6) now appears in the form of present equation (1) defining the output phase voltage across the wye winding leg 76a of transformer 72′ in terms of two difference pairs added together for the phase input voltages $A_0, B_0, C_0$. The present equation (1) contrasts with the reference equation (6) in these terms.

$$V_{A0} = \tfrac{1}{3}(A_0 - B_0 + A_0 - C_0) \tag{1}$$

Equations similar to the incorporated reference equations (7) and (8) for the two remaining symmetrical phase output voltages of the neutralizing transformer 72 need not be rewritten here to gain any further understanding of the analysis. The analysis proceeds further in terms of a compacted version of present equation (1) in which a scaler factor s is introduced in the numerator in order to account for a closed-wye input to output transformer coupling ratio with 1:s for primary to secondary transformer turns ratio. This signifies that you can change the turns ratio to any practicable value so that the output voltage is a function of the scaler within the range of the transformer limit of input to output turns ratio according to the equation.

$$V_{Ao} = \tfrac{s}{3}(V_{abo} - V_{cao}) \tag{2}$$

A similar voltage analysis is directed to the phase output voltage $V_{ab1}$ for the delta neutralizing transformer 70′ of FIG. 3 which has a turns ratio between a primary winding 71a and a secondary winding 74a in the delta connected set of √3:s. This is expressed in the relationship for the delta output voltage according to the equation.

$$V_{ab1} = \tfrac{s}{\sqrt{3}}(A_1 - B_1) \tag{3}$$

A common denominator factor of 3 and the scaling factor of s in the numerator are relocated as factors common to both of the present equations (2) and (3) which are next combined in order to express the output voltage of the respective transformer coupled secondary windings 76a, 74a. These voltages are series aiding as recognized from the upper dominant terminal dot notation on secondary windings 74a, 76a with the series current traversing same common to the circuit schematic of FIG. 1. This defines the prior art configuration of FIG. 1 as well as the top one-half portion of the circuit schematic of FIG. 3, which is unchanged according to the invention, both of which rely on the equation below.

$$V_{Ao} + V_{ab1} = \frac{s}{3}[(V_{abo} - V_{cao}) + \sqrt{3}\, V_{ab1}] \qquad (4)$$

Now referring to the waveforms of FIG. 2A designated $A_x$, $B_x$, $C_x$ which adopt the common subscript x designation to relate the respective pole voltage waveforms $90a_2$, $90b_2$, $90c_2$, for a first neutralizing delta transformer winding configuration in FIG. 3 referred to as a first truncated delta transformer 116 with the input voltages thereto having the respective phase delays of $-15°$, $-135°$, $105°$ with respect to the zero reference pole voltage waveform $30a_1$. Similarly, shown to receive the phase input voltage waveforms Ay, By, Cy is the second truncated delta transformer 118, and these voltages are represented respectively by the pole voltage waveforms $92a_3$, $92b_3$, $92c_3$ which are shown phase delayed $-45°$, $-165°$, $75°$ with respect to the zero reference pole voltage $30a_1$.

The voltage waveform development proceeds successively from the two sets of pole voltage waveforms for the neutralizing transformer truncated delta configurations 116, 118, as shown in FIG. 3. Each truncated delta transformer has interphase winding voltage relationships with the main input and output winding legs, which will become more evident from the waveforms of FIGS. 2A, 2B. The neutralizing transformers 116, 118 and their windings will be referred to in abbreviated terms of X-transformer 116 and Y-transformer 118 with this notation further being used to describe the following equation with respect to the successive waveforms in FIG. 2A. The X-transformer main input winding voltage $Vab_2$ is shown as a three level or two-step waveform 94 delayed $-15°$ with respect to the zero reference, since it is formed from the summation of Ax which is phased delayed identically and Bx which is inverted as seen in the subtraction thereof. The Y-transformer main winding input voltage $Vab_3$ is defined by the waveform 96 which is delayed by $-45°$ with respect to the zero reference since it is formed from the difference of pole voltage Ay, which is likewise delayed and By as graphically derived.

The last two waveforms in FIG. 2A introduce a scaler interphase winding constant $K = 0.366$, which is the same for all three phases and which proportionally reduces the magnitude of a waveform $Vca_2$ which is formed from the pole voltage difference between Cx which is delayed in phased by $-15°$ with respect to the zero reference and Ax. The entire waveform is inverted since the K is preceded by a minus sign indicating a 180° phase inversion. This produces an interphase winding voltage $Vca_2$ and likewise for $Vbc_3$ in waveform 102 which is proportionally reduced by K for a version of the difference of pole voltages By, which is phase delayed by $-165°$ with respect to the zero reference, and Cy which is advanced 75° with respect to the zero reference. The phase inversion of 180° is also indicated by the minus sign preceding the K in the expression.

A more direct expression for K in this instance is provided by $K = 1/(1 + \sqrt{3}) = 0.366$ which indicates that the number of turns in the interphase winding on each of the respective main winding cores is expressed by $K = 0.366$ times the number of turns on the main winding.

Next, referring to the topmost pair of waveforms shown in FIG. 2B, each of the voltage waveforms Vax and Vay is shown to express a proportionality for the respective phase output voltage of the X-transformer 116 and Y-transformer 118 shown in FIG. 3. The phase output voltage Vax is shown by the waveform 104 which is phase displaced $-15°$ with respect to the zero reference and occupies six different step levels within a period of 360°. This waveform is asymmetrical about the phase angle axis despite the symmetry that is present for each of the component waveforms 94 and 100, as shown in FIG. 2A. The X-transformer input difference voltage $Vab_2$ or symmetrical waveform 94 combines with the X-interphase winding voltage $KVca_2$, which is also a symmetrical waveform 100 as it is shown with components of equal amplitude $\pm$ KE extending in positive and negative extent with respect to a line of symmetry in-between. The significance of this symmetry to asymmetry transition in waveform 104 is the result of vector combining, performed through the process of voltage phasor addition. This accounts for a magnitude and a phase angle in the resultant which must be taken into account for each voltage phasor as it relates to any other voltage phasor. The output winding is coupled on the same winding core and is in phase with the input winding. The common core for the X-transformer main delta leg 122C is the same core for an interphase winding 124C which influences the resultant X-transformer output winding 122a connected at the junction Bx. The dot polarity sense of the interphase winding 124c is directly opposed by the dot sense end of the main input to output winding 122a of N1:N2 turns, so as to cause the resultant asymmetry of a voltage phasor which is represented by the resultant X-transformer phase voltage waveform 104. A similar proportionality is provided by the resultant Y-transformer phase output voltage Vby in waveform 106 which is likewise non-symmetrical about the axis which is shown in FIG. 2B, despite the apparent symmetry of waveforms 96 and 102 which respectively represent the voltage component $Vab_3$ and $-KVbc_3$. This shows that the symmetry to asymmetry transition of the Y-transformer main winding input to output voltage and the Y-interphase winding voltage is also caused by a vectorial combination of voltage phasors.

Those skilled in the art of complex number transformation used for electrical circuit analysis will understand that these tools for analytical investigation of voltage relationships are indispensable to the skilled practitioner. The voltage phasor relationships with reference to FIGS. 4A, 4B will be called upon to interrelate these analytical tools for the complete understanding of the structure and related functions indispensable to understanding the harmonic neutralization characteristics of truncated delta transformers of the type shown in FIG. 3. The result is the complete elimination of the eleventh and thirteenth harmonic components from the fundamental voltage frequency which remains after the cancellation of all low-order harmonic components between the fundamental frequency and twenty-four times the frequency of the fundamental voltage component.

Still referring to FIG. 2B, a combined resultant X-Y transformer output phase voltage $V_{2T\Delta}$ is a seven-step waveform 110 which is defined by the graphical summation of waveforms 104, 106 thereabove, and this returns the axis symmetry which was lost in the formation of the two constituent waveforms as described above. Each of the seven steps of the voltage waveform 110 are defined in terms of the modifier of magnitude of the pole voltage magnitude E with a multiplying factor. This modifier steps from (1 + K), (2 + K), (2 + 2K) before descending on the staircase with a sine-like symmetry about a horizontal zero axis. The voltage waveform 110 represents the combined resultant X-Y transformer phase output voltage, and it has been discovered that this must be modified by a scaler magnitude. It is shown in the penultimate waveform 110′ which is defined as the scaled combined resultant waveform 110 having a multiplying factor of $(\sqrt{\tfrac{2}{3}})V_{2T\Delta}$ which is likewise shown to trace the proportional seven-step staircase of amplitude modified steps. These steps rise from the zero voltage level after a $-15°$ phase delay with respect to the zero reference to achieve the voltage level $E(1 + K)\sqrt{\tfrac{2}{3}}$, following the same pattern of stepwise increment and decrement in a sine-like symmetry arranged about the zero reference. This waveform 110 is exactly designed to compensate for the presence of eleventh and thirteenth harmonic components which are present in a six-step voltage waveform 112 which represents voltage $V_{y\Delta}$ more familiarly seen from the previously developed present equation (4). The scaler quantity "s" is used as an output voltage adjustment in the winding turns ratio for the output voltage waveforms 110 or 110′ and 112 to provide the proper level of output voltage for the composite transformer resultant phase output voltage $V\phi A$ which is present at the output terminal 90a′ shown in FIG. 3.

A resultant twelve-step voltage waveform 114 is likewise shown to have a sine-like symmetry which oscillates between plus and minus values or $\pm E[2 + \sqrt{3} + (2 + 2K)\sqrt{2}]$ where K is the constant factor defined previously as $K = 0.366$. The intermediate levels of the voltage waveform 114 are shown to be steps of equal phase duration of 15° each with risers, which are not all equal in vertical extent, since each is dependent on the particular stepwise level of the scaled voltage waveforms 110′ and 112 which possess an unequal seven-step and six-step level function, respectively. These steps are interplayed in the development of the composite twelve-step output voltage waveform 114 which is shown over a full period of 360°.

The illustrated graphical summation of the waveforms 110′ and 112 to achieve the resultant composite transformer output voltage 114 is mathematically verifiable for each phase output, but consideration will be given only to phase A. This provides consistency with the graphic waveform analysis which has been given above, and mathematical representations for the X-Y truncated delta transformer component output voltages are now further established.

$$V_{2T\Delta} = \tfrac{3}{2}[V_{ax} + V_{ay}] = [V_{ab2} - KV_{ca2} + V_{ab3} - Kv_{bc3}] \quad (5)$$

Figure 4A:
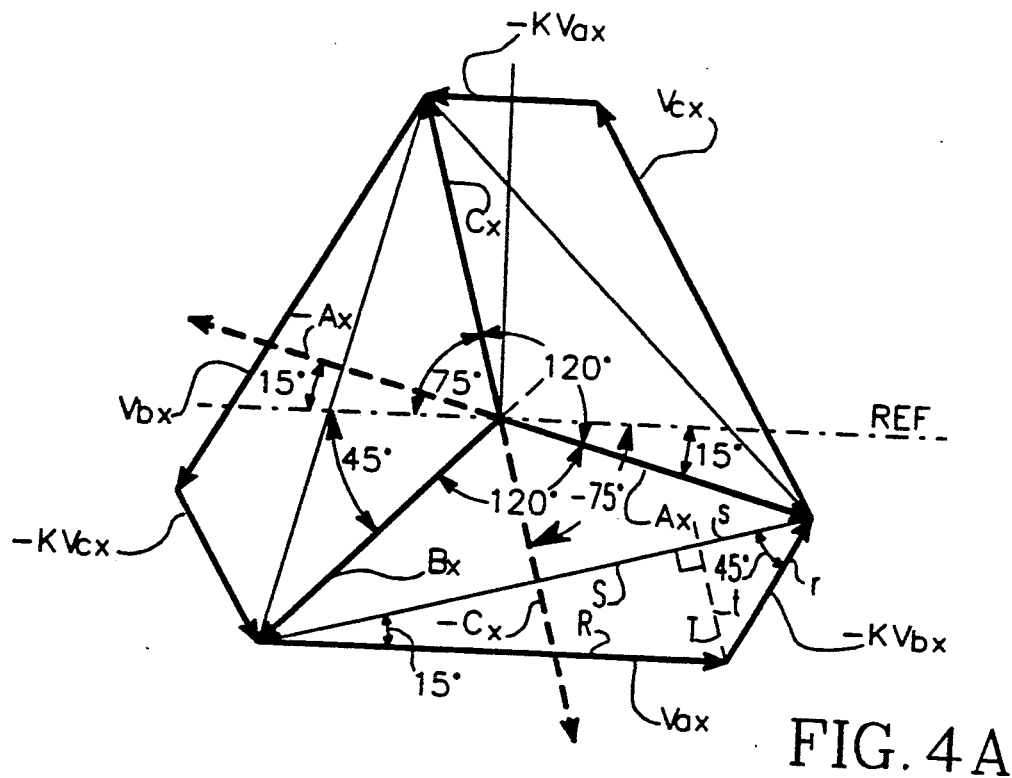
Figure 4B:
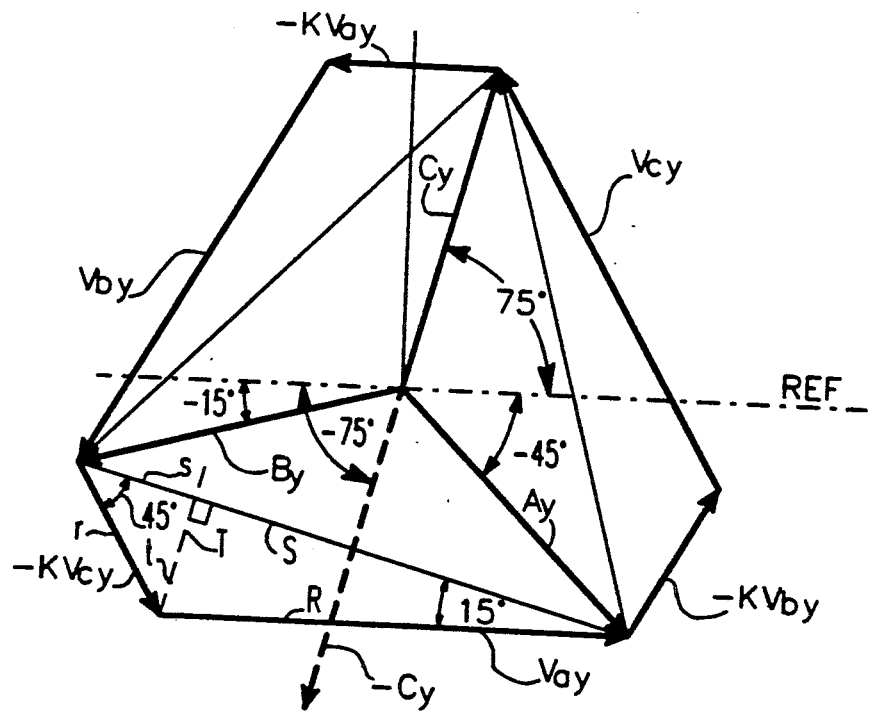

Grouping terms affected by the factor K and multiplying all of the terms in equation (5) by a factor $\tfrac{2}{3}$ which is the reciprocal of the proportionality factor $(1+K+K^2)$ as derived from an analysis of the relative magnitudes of the voltage phasors constituting $V_{ax}$ and $V_{ay}$ in FIGS. 4A and 4B, respectively, this modifies the form of equation (5) to provide.

$$\tfrac{2}{3}V_{2T\Delta} = (V_{ax}+V_{ay}) = \tfrac{2}{3}[V_{ab2}+V_{ab3}-K(-V_{ca2}+V_{bc3})] \quad (6)$$

Progress for the following analysis of transformer 116, 118 is clearly seen with respect to the set of symmetrical input phase voltages Ax, Bx, Cx. The central core set of voltage phasors is symmetrically displaced by 120° as shown in FIG. 4A. Likewise the input phase voltages Ay, By, Cy are shown as a symmetrical core set of voltage phasors. These sets of input voltage phasors are used to expand each of the contracted voltage terms in equation (6) in order to arrive at the expansion.

$$\tfrac{2}{3}V_{2T\Delta} = \tfrac{2}{3}[Ax - Bx + Ay - By - K(Cx - Ax + By - Cy)] \quad (7)$$

where: $Ax = A\underline{/-15°}$, $Bx = A\underline{/-135°} = -A\underline{/45°}$
$Cx = A\underline{/105°}$, $-Cx = A\underline{/-75°}$
$Ay = A\underline{/-45°}$, $By = -A\underline{/15°}$, $Cy = A\underline{/75°}$
and: A represents the common voltage wave referenced to /0°.

Since all of the amplitude components of the symmetrical voltage input phasors are equal, each is represented by amplitude A associated with respective angles $-15°$, $45°$, $-45°$, $15°$, for terms in equation (7) which are not grouped with the multiplier constant K, and with amplitude A and respective phase angles $-75°$, $-15°$, $15°$, $75°$, respectively, for the terms in equation (7) which are grouped with the multiplier K. A further expansion is in terms of cosine and sine components for each of the above voltage phasors with the argument determined by the respective phase angles. This shows that all of the sine terms cancel in the terms where there is no K multiplier, while only the sine $\pm 75°$ and sine $\pm 15°$ terms multiplied by K cancel, and the cosine terms in the expansion for same do not cancel. This is summarized in equation (8) which has magnitude A factored as a multiplier removed from the bracketed quantity.

$$\tfrac{2}{3}V_{2T\Delta} = \tfrac{2}{3}A[2\cos 15° + 2\cos 45° + \quad (8)$$

$$K(\cos -75° + \cos -15° + \cos 15° + \cos 75°)]$$

Since the first and third quadrant cosine terms for the projection to the real or horizontal axis are opposite signed angles, these can be combined into terms and angles of one sign multiplied by a factor of 2. Since 2 is a factor of all terms equation (8) has terms regrouped as indicated.

$$\tfrac{2}{3}V_{2T\Delta} = 4/3A[(K+1)\cos 15° + \cos 45° + K\cos 75°] \quad (9)$$

A fundamental concept for the sum of the truncated delta neutralizing transformers 116, 118 is represented in equation (9), and this is also used to generically represent the remaining harmonic components for same by designating a subscript and factor n for the harmonic number according to the definition.

$$\tfrac{2}{3}(V_{2T\Delta})_n = \tfrac{4}{3}A_n[(K+1)\cos 15°\,n + \cos 45°\,n + K\cos 75°\,n] \quad (10)$$

Where: n is a harmonic number, $n = (12N \pm 1)$

For: $(V_{ax} + V_{ay})_n = 0$ when $n \neq (12N\pm1)$ for $N = 0, 1, 2, 3$, etc.

It will be seen that for $N = 1$, according to the above definition, $n = 11$ or $13$ and will yield a number evaluated from the argument of cosine terms and using the constant factor of $K = 0.366$, a value for each harmonic component with $n = 11$ or $13$ is $\frac{2}{3}(V_{2T\Delta})_n = -2.82A$. Setting $-2.82A = -2\sqrt{2} An$, the following abbreviated reduction is recognized.

$$\frac{2}{3}(V_{2T\Delta})_n = 2\sqrt{2} An \text{ (When $N$ is an even integer)} \quad (11)$$

$$= -2\sqrt{2} An \text{ (When $N$ is an odd integer)}$$

$$\text{So } \frac{2}{3}(V_{2T\Delta})_n = 2\sqrt{2} An \cos(180° N)$$

It is also mathematically recognized that an infinite series expression is available to express the truncated delta neutralizing two-transformer primary voltage in terms of its harmonic voltage components with the same definitions for N and harmonic number n.

$$\frac{2}{3} V_{2T\Delta} = 2\sqrt{2} \sum_{n=\to} An_1 \cos_\infty (180° N) \sin n\omega t \quad (12)$$

A series of sine terms in an infinite series can also be expanded to a relevant low-order harmonic component limit, with the eleventh and thirteenth harmonic values taking on negative amplitude terms. This is because the factor in equation (12) with cosine (180°N) yields the following result:

$$\frac{2}{3} V_{2T\Delta} = 2\sqrt{2} \, s[H_1 \sin \omega t - H_{11} \sin 11 \omega t - H_{13} \sin 13 \omega t + \quad (13)$$

$$H_{23} \sin 23 \omega t + H_{25} \sin 25 \omega t + \text{ etc.}]$$

Where:

$$Hn = \frac{An}{s}$$

for $n = 1, 11, 13, 23, 25$, etc., defines the amplitude of the $n$ harmonics of the input voltage from the inverter with $s$ being a transformer scaling factor.

$$An = \frac{2E}{n\pi} \text{ for an unnotched square wave only.}$$

It is with measured consequence that the sine term expansion presented by equation (13) is eminently suitable for combining with a sine term expansion in the form of previously derived equation (12) which occurs in the second incorporated U.S. patent application. It provides therein that a composite output voltage $V_{A0} + V_{ab2}$ is from a combined wye transformer sine expansion waveform $V_{A0}$ in equation (10) therein and a delta transformer sine expansion of output voltage $V_{ab}$ presented in equation (11) therein. Both of these expansions form a counterpart composite expansion for the respective transformers 72' and 70' and their respective phase output windings 76a, 74a. A modified form of the second incorporated U.S. application derived equation (12) is shown in the present context as a sine expansion for the relevant low-order harmonics which include the eleventh and the thirteenth harmonic components among others.

$$V_{y\Delta} = V_{ao} + V_{ab1} = 2s[H_1 \sin \omega t + H_{11} \sin 11 \omega t + \quad (14)$$

$$H_{13} \sin 13 \omega t + H_{23} \sin 23 \omega t + H_{25} \sin 25 \omega t + \text{ etc}].$$

It is notable that equation (14) has positive eleventh and thirteenth harmonic components which are canceled by the summation of like harmonic components with arguments (n$\omega$T) of the sine terms. These also are characteristic arguments of the sine terms in equation (13), within a constant factor of cancellation, for the terminal 90a' output voltage V$\phi$A to succeed in having no low-order harmonics. The fundamental voltage $H_1$ sin $\omega t$ components presently are additive for each of equations (13), (14).

A constant suitable for combining like argument terms in equations (11) and (13) is a divisor of $\sqrt{2}$ for equation (13), so as to affect the constant multiplier outside the brackets for each term in this sine expansion and thus the transformer turns ratio of $\sqrt{2}$:s. The resultant composite transformer output phase voltage V$\phi$A is devoid of eleventh and thirteenth harmonics, as well as all the other low-order harmonic components less than twenty-three times the fundamental frequency, to provide the resultant composite voltage.

$$V\phi A = V_{Y\Delta} + \tfrac{2}{3} V_{2T\Delta} = 4s[H_1 \sin \omega t + H_{23}\sin 23\omega t + H_{25}\sin 25 \omega t + \text{etc.}] \quad (15)$$

The description has provided a complete analysis of the schematic block diagram of both a prior art twelve-pole, three phase static inverter with respect to FIG. 1, for two bridge-fed configured pairs of wye with delta transformer circuits connected for harmonic reduction. The invention has reduced this to only one configured pair of wye with delta transformer, and the invention combines in FIG. 3 the similarly numbered, prime number components, with a pair of truncated delta transformers 116, 118, which forms a different second set-pair of harmonic neutralizing transformers. These are used in place of the similarly positioned and input connected wye transformer 82 with delta transformer 80 set-pair. This is done without altering the phase displaced sets of pole voltage connections, but it is in order to generate the set of waveforms shown and described with respect to FIGS. 2A, 2B culminating in the V$\phi$A composite transformer output voltage waveform 114 shown at the bottom of FIG. 2B and mathematically described in the resultant derivation of equation (15). More description is now provided for the truncated delta neutralizing transformers which are used in combination according to the invention to provide the desired result. This result is reiterated as the complete elimination of the eleventh and thirteenth harmonic components.

A description has been presented in the second incorporated U.S. patent application with reference to FIG. 9 therein describing an alternate transformer configuration in the form of first and second neutralizing transformers 120. The exclusive use of truncated delta transformers achieves harmonic neutralization using a delta with another delta-paired transformer configuration 120 connected to a six-pole inverter 112 which was also shown in FIG. 9 therein. The delta with another delta-paired transformer configuration 120, referred to in the second incorporated U.S. application, achieves the entire result of harmonic neutralization in a six-pole arrangement which is unlike the twelve-pole inverter of the present invention. The present invention accomplishes a similar purpose which is not necessarily relegated to switched or notched pole voltages for becoming optimized with notching in order to control the fundamental voltage over a predetermined controllable range, independently of the DC source voltage. Although the present invention can forseeably be used with notched pole voltage waveforms, the major difference is that the present invention uses the truncated delta transformers 116, 118 in combination with the first set-pair of harmonic neutralizing transformers 72′, 70′ rather than in place of them.

The first truncated delta transformer with interphase windings is similar to the description provided for the transformers in the second incorporated U.S. application. The X-transformer configuration 116 includes first main branch winding leg transformers 122a, 122b, 122c, each having a respectively associated interphase winding 124a, 124b, 124c wound on the same respective core and connected across from it in a series circuit line-to-line branch to form a junction with a phase displaced main winding branch of another delta leg transformer. The interphase winding 124a is connected between the main branch input winding legs 122b, 122c, while the interphase winding 124b, wound on the same core as the main winding delta leg transformer 122b, is connected between main delta transformer windings 122a, 122c, and the remaining interphase transformer winding 124c is connected between the main delta winding transformers 122a, 122b. This arrangement is functionally termed a truncated delta winding arrangement, since the corners of a conventional delta are truncated or cut-off by the interphase winding connections. The output transformer windings of main branches for the delta transformers 122a, 122b, 122c combines with a respective 30° phase displaced delta winding set of the second set-pair.

The interphase windings have $(1/(1 + \sqrt{3}))N_1 = 0.366$ times the primary winding turns $N_1$ or fraction of the number of main winding turns. These windings are respectively designated 124a, 124b, 124c, which are wound on the same core as the main winding which the letter of the alphabet designates, namely that for 122a, 122b, 122c. The interphase winding, coupled with a main phase winding on the same core, is not to be confused with an interphase transformer which is a device used to hold off voltage differences while dividing current paths. The dashed line between related core winding pairs functionally indicates that they are connected in an arrangement displaced from the related main winding via a 120° phase relationship. This phase displacement may be more clearly seen with reference to an integrated set of voltage phasors in FIGS. 4A and 4B which have been combined vectorially to form, for example, the resultant X-transformer phase output voltage 104 in FIG. 2B which has been described in terms of vector addition of component voltage phasors with respect to the zero reference voltage.

A graphic phasor summation is shown in FIG. 4A for the main delta output winding component voltages which are designated Vax, Vbx, Vcx, and these are shown with Vax being predisposed horizontally or exactly in phase with a horizontal reference axis. The reference axis REF passes through the center of the symmetrically displaced phase input voltage phasors Ax, Bx, Cx, which rotate in a counterclockwise fashion at angular frequency $\omega = 2\pi F$ where F is the harmonic frequency of the fundamental voltage for the fundamental voltage phasors shown. The angular frequency is an integer function which is proportional to a number factor times the harmonic angular momentum $\omega$ for each of the harmonic components presented. Similar voltage phasor diagrams may be used for each harmonic component to rotate from an initially displaced phase angle, through an integer number of harmonic rotations, and are rotationally positioned from a remainder of 1/360° to determine relative phase position. The initial phase displacement for each harmonic voltage phasor is thus accounted for as an integer harmonic number factor with the angle measured from the initial phase displacement of the fundamental as shown in the waveforms of FIGS. 2A, 2B.

The relationship for the phase output voltage phasor Vax is also with its tip touching the tail of interphase voltage phasor −KVbx which lags the main winding output voltage Vax by 120° phase displacement with inverting phase displacement of 180° to account for the negative value thereof. The selection of the input phase voltage Ax delayed by −15° with respect to the horizontal zero REF which is shown exactly at the instant of time characterization for this input voltage. It will further be seen that phase input voltage Bx lags by −120° therefrom, and thus it is displaced from the zero reference by −135°. Likewise input voltage phasor Cx is positioned midway between Ax and Bx at 105° which is 120° phase rotation counterclockwise from the −15° position of phasor Ax.

An important relationship set and verified by the FIG. 4A diagram is the rotation ABC as viewed from a point on the reference axis viewpoint. This counterclockwise rotation of the voltage phasors comes into view according to the sequence of notation ABC. The value of the interphase constant $K = 0.366$ is related to the angles and voltage phasor magnitudes in the phasor diagram in the ratio of sine 15°/sine 45°. The trigonometric relationship is defined by the length of elements T/R and by t/r of the two right triangles formed by the perpendicular $t = T$. The perpendicular $t = T$ is projected from the apex of the output voltage phasors to form the two adjacent right triangles with a right angle formed at their respective base S and s as shown. The voltage phasor represented by the component $S + s = A_x - B_x$ in FIG. 4A and likewise $= A_y - B_y$ in FIG. 4B corresponds to voltage waveforms $V_{ab2}$ and $V_{ab3}$, 94, 96, respectively, in FIG. 2A. This arrangement satisfies the portionality relationship for the phasor diagram to be correctly configured with $r/R = K = 0.366$.

The second non-standard delta winding connection transformer 118 is similar to the first truncated delta winding connection transformer configuration 116 in that it includes first main branch winding delta leg transformers 126a, 126b, 126c, each having a respectively associated interphase winding 128a, 128b, 128c wound on the same core. The main branch input windings are connected across the space from the respective core associated interphase winding to form a junction with a phase displaced interphase winding of another main branch input winding. The interphase winding 128a is connected between the main branch winding legs 126b, 126c, while the interphase winding 128b is connected between main branch winding legs 126a, 126c. The remaining interphase winding 128c is connected between the main branch windings 126a, 126b. The main windings and interphase windings for each of the truncated delta winding transformers are symbolically represented by associated dashed lines between a common core used for the respective interphase winding and winding pairs and thus serves to suggest the relationship.

The graphic phasor summation of the main winding resultant output phasor voltages $V_{ay}$, $V_{by}$, $V_{cy}$ represents a balanced set of truncated delta winding voltages in magnitude and phase. These are shown in FIG. 4B to be vectorially supplemented by the interphase winding component voltage phasors similar to those described with respect to FIG. 4A. The difference in perspective is that the input phase voltages are now each shown to be phase delayed $-45°$ with respect to the zero reference REF as seen for input phase voltage Ay instantly residing at $-45°$ therefrom. The zero REF displacement is also relative to the input phase voltages By, Cy, which shows each of these are phase displaced 120° with respect to the counterclockwise rotation defined as ABC. This is same rotation as for the phasors shown in FIG. 4A. This phasor diagram also is verification that the resultant Y-transformer phase voltage waveform 106 in FIG. 2B, as the summation of proportionally arranged components from the main winding and interphase winding contributions is properly characterized.

The voltage phasor Vay which is resultant from the Y-transformer 118 additively combines with the voltage phasor Vax resultant from the X-transformer 116 since they are both in phase reference alignment. The zero reference REF passes through the centerpoint of the respective phasor sets which may be merged from a unifocal point at the same instant of time and for all time. At any time later they will still be in the established relative phase relationship while rotating counterclockwise at the same angular velocity $\omega$, which means that this relationship is fixed. The tracing out of the sinusoidal voltage waveforms previously presented is now conclusive for the timephase elimination of the eleventh and thirteenth harmonics. All the low-order harmonics below the number twenty-three times the fundamental are eliminated or cancelled in the frequency spectrum of the composite transformer output $V\phi A$ for this phase. The same is true for the other phases of the presently inventive twelve-pole, three-phase inverter system.

What is claimed is:

1. A twelve-pole inverter apparatus for a three-phase inverter system which provides a fundamental output voltage adapted to be controlled independently of a source of DC input voltage, said apparatus comprising:
    bridge inverter means providing four separate sets of constantly phase displaced pole voltages in two set-pairs constituted by first and second set-pairs of three-phase pole output voltages;
    first neutralizing means connected to receive the pole voltages from the first set-pair, and second neutralizing means connected to receive the pole voltages from the second set-pair, said first neutralizing means including at least one pair of neutralizing transformers being connected in a wye with a delta paired configuration to receive the first set-pair of pole voltages from the bridge inverter means for primary windings, and said second neutralizing means including a second set-pair of neutralizing transformers being connected in a truncated delta with a truncated delta paired configuration to receive the second set-pair of pole voltages from the bridge inverter means;
    each phase pole voltage in a set-pair being phase rotated or displaced 120 degrees in a periodic cycle, each pole voltage of each half of a set-pair being further phase displaced a first predetermined amount of phase displacement with respect to the other half of each set-pair of pole voltages for the individual phases of respective circuits in said bridge inverter means, and each phase pole voltage of the second set pair being phase displaced one-half the first predetermined amount of phase displacement to straddle respective pole output phase voltages of an individual first set-pair,
    said first and second neutralizing means eliminating the low-order harmonic component content so that only those harmonic voltage components of a frequency immediately next adjacent to whole number multiples of twenty-four times fundamental frequency remain, while odd number harmonics of less than twenty-three times the fundamental frequency are cancelled,
    thereby to reduce and eliminate the low-order harmonic component content of output voltage of inverter circuit while preserving fundamental component output voltage waveform.

2. The inverter of claim 1 including an output circuit with terminals at which harmonically neutralized fundamental output voltages are measurable, said output circuit including a composite transformer circuit which serially combines aiding and opposing transformer windings being coupled from respective winding pairs of neutralizing transformers.

3. The inverter of claim 1, wherein said bridge inverter means includes two set-pairs of six-pulse bridge inverter circuits which provide the separate sets of phase displaced three-phase pole voltages which serve as input to respective neutralizing transformer input winding connections, the phase displacement between each respective phase of related phases (A-B-C) of one and the other of both set-pairs of bridge inverter circuits being 30 degrees, and the phase displacement between the related phases of the first set-pairs being straddled with respect to the second set-pair.

4. A twelve-pole inverter apparatus for a three-phase inverter system which provides a fundamental output voltage adapted to be controlled independently of a source of DC input voltage, said apparatus comprising:
    bridge inverter means providing four separate sets of constantly phase displaced pole voltages in two set-pairs constituted by first and second set-pairs of three-phase pole output voltages;
    first neutralizing means connected to receive the pole voltages from the first set-pair, and second neutralizing means connected to receive the pole voltages from the second set-pair, said first neutralizing means including at least one pair of neutralizing transformers being connected in a wye with a delta paired configuration to receive the first set-pair of pole voltages from the bridge inverted means for primary windings, and said second neutralizing means including a second set-pair of neutralizing transformers being connected in a delta with a delta paired configuration to receive the second set-pair of pole voltages from the bridge inverter means,
    said delta paired transformer winding configuration is of the type in which a transformer interphase winding is connected serially with a main transformer winding of a different or shifted phase, and the delta paired transformer configuration functions as a truncated type of arrangement such as two truncated delta transformers connected in an opposing paired configuration;

each phase pole voltage in a set-pair being phase rotated or displaced 120 degrees in a periodic cycle, each pole voltage of each half of a set-pair being further phase displaced a first predetermined amount of phase displacement with respect to the other half of each set-pair of pole voltages for the individual phases of respective circuits in said bridge inverter means, and each phase pole voltage of the second set pair being phase displaced one-half the first predetermined amount of phase displacement to straddle respective pole output phase voltages of an individual first set-pair, thereby to reduce and eliminate the low-order harmonic component content of output voltage of inverter circuit while preserving fundamental component output voltage waveform.

5. A twelve-pole inverter apparatus for a three-phase inverter system which provides a fundamental output voltage adapted to be controlled independently of a source of DC input voltage, said apparatus comprising:

bridge inverter means providing four separate sets of constantly phase displaced pole voltages in two set-pairs constituted by first and second set-pairs of three-phase pole output voltages;

first neutralizing means connected to receive the pole voltages from the first set-pair, and second neutralizing means connected to receive the pole voltages from the second set-pair;

an output circuit with terminals at which harmonically neutralized fundamental output voltages are measurable, said output circuit including a composite transformer circuit which serially combines aiding and opposing transformer windings being coupled from respective winding pairs of neutralizing transformers, said output circuit constituting a transformer coupled closed-wye secondary composite circuit; and, each phase voltage in a set-pair being phase rotated or displaced 120 degrees in a periodic cycle, each pole voltage of each half of a set-pair being further phase displaced a first predetermined amount of phase displacement with respect to the other half of each set-pair of pole voltages for the individual phases of respective circuits in said bridge inverter means, and each phase pole voltage of the second set pair being phase displaced one-half the first predetermined amount of phase displacement to straddle respective pole output phase voltages of an individual first set-pair, thereby to reduce and eliminate the low-order harmonic component content of output voltage of inverter circuit while preserving fundamental component output voltage waveform.

6. A twelve-pole inverter apparatus for a thee-phase inverter system which provides a fundamental output voltage adapted to be controlled independently of a source of DC input voltage, said apparatus comprising:

bridge inverter means providing four separate sets of constantly phase displaced pole voltages in two set-pairs constituted by first and second set-pairs of three-phase pole output voltages;

first neutralizing means connected to receive the pole voltages from the first set-pair, and second neutralizing means connected to receive the pole voltages from the second set-pair;

each phase pole voltage in a set-pair being phase rotated or displaced 120 degrees in a periodic cycle, each pole voltage of each half of a set-pair being further phase displaced a first predetermined amount of phase displacement with respect to the other half of each set-pair of pole voltages for the individual phases of respective circuits in said bridge inverter means, and each phase pole voltage of the second set pair being phase displaced one-half the first predetermined amount of phase displacement to straddle respective pole output phase voltages of an individual first set-pair, an output circuit with terminals at which harmonically neutralized fundamental output voltages are measurable, said output circuit including a composite transformer circuit which serially combines aiding and opposing transformer windings being coupled from respective winding pairs of neutralizing transformers, said composite transformer output circuit including aiding sense pairs of associated secondary windings and opposing sense pairs of associated secondary windings connected in series with each other, each said respective sensed secondary winding is coupled to a similarly sensed respective phase primary winding of associated neutralizing transformer, thereby to reduce and eliminate the low-order harmonic component content of output voltage of inverter circuit while preserving fundamental component output voltage waveform.

7. A twelve-pole inverter apparatus for a three-phase inverter system which provides a fundamental output voltage adapted to be controlled independently of a source of DC input voltage, said apparatus comprising:

bridge inverter means providing four separate sets of constantly phase displaced pole voltages in two set-pairs constituted by first and second set-pairs of three-phase pole output voltages, said bridge inverter means include two set-pairs of six-pulse bridge inverter circuits which provide the separate sets of phase displaced three-phase pole voltages which are adapted to serve as input to respective neutralizing transformer input winding connections, the phase displacement between each respective phase of the related phases (A-B-C) of one and the other of both set-pairs of bridge inverter circuits being 30 degrees, and the phase displacement between the related phases of the first set-pairs being straddled with respect to the second set-pair;

first neutralizing means connected to receive the pole voltages from the first set-pair, and second neutralizing means connected to receive the pole voltages from the second set-pair;

each phase pole voltage in a set-pair being phase rotated or displaced 120 degrees in a periodic cycle, each pole voltage of each half of a set-pair being further phase displaced a first predetermined amount of phase displacement with respect to the other half of each set-pair of pole voltages for the individual phases of respective circuits in said bridge inverter means, and each phase pole voltage of the second set pair being phase displaced one-half the first predetermined amount of phase displacement to straddle respective pole output phase voltages of an individual first set-pair, and said six-pulse circuits are adapted to be switchably controlled by strategic notching for reducing the pole voltage therefrom, within the range of a zoned or positioed half-wave time controlled interval notch, thereby to reduce and eliminate the low-order harmonic component content of output voltage of inverter circuit while preserving fundamental component output voltage waveform.

8. A method of operating a twelve-pole inverter apparatus for a three-phase inverter system which provides a fundamental output voltage adapted to be controlled independently of a source of DC input voltage, said method comprising:

providing four separate sets of constantly phase displaced pole voltages in two set-pairs from bridge inverter output constituted by first and second set-pairs of three-phase pole voltages;

connecting first neutralizing means to receive the pole voltages from the first set-pair and connecting second neutralizing means to receive the pole voltages from the second set-pair, said connecting of said first and second neutralizing means eliminating the low-order harmonic components so that only those harmonic voltage components of a frequency immediately next adjacent to whole number multiples of twenty-four times the fundamental frequency remain, while odd number harmonics of less than twenty-three times the fundamental frequency are cancelled;

additionally rotating each phase pole voltage in a set-pair, after already being phase rotated or displaced 120 degrees in a periodic cycle, so that each pole voltage of each half of a set-pair is further phase displaced a first predetermined amount of phase displacement with respect to other half of each set-pair of pole voltages for individual phases, so that each phase pole voltage of the second set-pair is phase displaced one-half the first predetermined amount of phase displacement to straddle respective pole phase voltages of the individual first set-pair, said connecting the first neutralizing means includes connecting at least one pair of neutralizing transformers in a wye with a delta paired configuration to receive the first set-pair of pole voltages from the bridge inverter output means for primary windings, and connecting said second neutralizing means includes connecting a second set-pair of neutralizing transformers in a truncated delta with a truncated delta paired configuration to receive the second set-pair of pole voltages from the bridge inverter output, thereby reducing and eliminating low-order harmonic component content, below twenty-three times fundamental frequency of the output voltage of inverter circuit, while preserving fundamental component output voltage waveform.

9. The method of operating the inverter of claim 8 including connecting an output circuit measuring harmonically neutralized fundamental output voltages, said output circuit serially combining in a composite transformer circuit with aiding and opposing transformer windings coupled from the respective winding pairs of neutralizing transformers.

10. The method of operating the inverter of claim 8, wherein the step of connecting separate sets of phase displaced three-phase pole voltages to respective neutralizing means provides the phase displacement between each respective phase of related phases in an ABC rotation with one and other of both set-pairs being 30 degrees, and straddling the phase displacement between the related phases of the first set-pair being 15 degrees with respect to the second set-pair.

11. A method of operating a twelve-pole inverter apparatus for a three-phase inverter system which provides a fundamental output voltage adapted to be controlled independently of a source of DC input voltage, said method comprising:

providing four separate sets of constantly phase displaced pole voltages in two set-pairs from bridge inverter output constituted by first and second set-pairs of three-phase pole voltages;

connecting first neutralizing means to receive the pole voltages from the first set-pair and connecting second neutralizing means to receive the pole voltages from the second set-pair, the connecting of the first neutralizing means includes connecting at least one pair of neutralizing transformers in a wye with a delta paired configuration to receive the first set-pair of pole voltages from the bridge inverter output means for primary windings, and connecting said second neutralizing means includes connecting a second set-pair of neutralizing transformers in a delta with a delta paired configuration, so that connecting the delta paired transformer winding configuration connects a transformer interphase winding serially with a main transformer winding of a different or shifted phase;

and operating delta paired transformer configuration as a truncated type of arrangement such as two truncated delta transformers connected in an opposing pair configuration in order to receive the second set-pair of pole voltages from the bridge inverter output;

additionally rotating each phase pole voltage in a set-pair, after already being phase rotated or displaced 120 degrees in a periodic cycle, so that each pole voltage of each half of a set-pair is further phase displaced a first predetermined amount of phase displacement with respect to other half of each set-pair of pole voltages for individual phases, so that each phase pole voltage of the second set-pair is phase displaced one-half the first predetermined amount of phase displacement to straddle respective pole phase voltages of the individual first set-pair, thereby reducing and eliminating low-order harmonic component content, below twenty-three times fundamental frequency of the output voltage of inverter circuit, while preserving fundamental component output voltage waveform.

12. A method of operating a twelve-pole inverter apparatus for a three-phase inverter system which provides a fundamental output voltage adapted to be controller independently of a source of DC input voltage, said method comprising:

providing four separate sets of constantly phase displaced pole voltages in two set-pairs from bridge inverter output constituted by first and second set-pairs of three-phase pole voltages;

connecting first neutralizing means to receive the pole voltages from the first set-pair and connecting second neutralizing means to receive the pole voltages from the second set-pair, the step of connecting separate sets of phase displaced three-phase pole voltages to respective neutralizing means providing the phase displacement between each respective phase of related phase in an ABC rotation with one and other of both set-pairs being 30 degrees;

additionally rotating each phase pole voltage in a set-pair, after already being phase rotated or displaced 120 degrees in a periodic cycle, so that each pole voltage of each half of a set-pair is further phase displaced a first predetermined amount of phase displacement with respect to other half of each set-pair of pole voltages for individual phases; so that each phase pole voltage of the second set-pair is phase displaced one-half the first predetermined amount of phase displacement to straddle respective pole phase voltages of the individual first set-pair, the straddling of the phase displacement between the related phases of the first set-pair being 15 degrees with respect to the second set-pair;

and, the step of providing the pole voltages being adapted for switchably controlling by strategic notching for reducing the output pole voltage therefrom, within the range of a zoned or positioned half-wave time controlled interval notch, thereby reducing and eliminating low-order harmonic component content, below twenty-three times fundamental frequency of the output voltage of inverter circuit, while preserving fundamental component output voltage waveform.

* * * * *